(12) United States Patent
Betts et al.

(10) Patent No.: US 8,745,030 B2
(45) Date of Patent: Jun. 3, 2014

(54) FAST SEARCHING OF DIRECTORIES

(75) Inventors: Christopher Betts, Mount Dandenong (AU); Tony Rogers, Mooroolbark (AU)

(73) Assignee: CA, Inc., Islandia, NY (US)

( * ) Notice: Subject to any disclaimer, the term of this patent is extended or adjusted under 35 U.S.C. 154(b) by 3289 days.

(21) Appl. No.: 11/089,414

(22) Filed: Mar. 24, 2005

(65) Prior Publication Data

US 2005/0228793 A1 Oct. 13, 2005

Related U.S. Application Data

(63) Continuation of application No. 10/887,991, filed on Jul. 9, 2004, now abandoned.

(60) Provisional application No. 60/486,650, filed on Jul. 11, 2003.

(51) Int. Cl.
*G06F 7/00* (2006.01)

(52) U.S. Cl.
USPC .......................................................... 707/713

(58) Field of Classification Search
USPC ......................................... 707/104.1, 100, 10
See application file for complete search history.

(56) References Cited

U.S. PATENT DOCUMENTS

| | | | | |
|---|---|---|---|---|
| 6,047,286 | A * | 4/2000 | Burrows | 707/4 |
| 6,539,399 | B1 * | 3/2003 | Hazama et al. | 1/1 |
| 6,973,572 | B1 * | 12/2005 | Elliot et al. | 713/176 |
| 7,000,089 | B2 * | 2/2006 | Durr et al. | 711/202 |
| 7,016,540 | B1 * | 3/2006 | Gong et al. | 382/225 |
| 7,168,025 | B1 * | 1/2007 | Berkovich | 714/759 |
| 7,225,197 | B2 * | 5/2007 | Lissar et al. | 707/700 |
| 7,240,125 | B2 * | 7/2007 | Fleming | 709/246 |
| 2002/0078069 | A1 * | 6/2002 | Moore | 707/200 |
| 2002/0129153 | A1 * | 9/2002 | Fleming | 709/230 |
| 2002/0184222 | A1 * | 12/2002 | Kohut et al. | 707/10 |

OTHER PUBLICATIONS

PCT Notification of Transmittal of the International Search Report and the Written Opinion of the International Searching Authority, or the Declaration for International Application No. PCT/US2004/022323; 11 pages, Jul. 9, 2004.

Haerder T. and Rahm E.: "Mehrdimensionale Zugriffspfade"; Datenbanksysteme Konzepte and Techniken Der Implmentierung, pp. 243-253; XP-002313408; Berlin, Heidelberg, New York; ISBN: 3-540-65040-7, 1999.

Bruno L.: "Tie It All Together. Directories Have Grown in Complexity and Size—But There are Ways to Control the Chaos", Data Communications, McGraw Hill, New York, US, vol. 26, No. 3; XP000659544, Mar. 1997.

Gaede V. et al.: "Multidimensional Access Methods" ACM Computing Surveys, New York, NY, US, vol. 30, No. 2; XP-001013923, Jun. 1998.

(Continued)

*Primary Examiner* — Hosain Alam
*Assistant Examiner* — Eliyah S Harper
(74) *Attorney, Agent, or Firm* — Baker Botts, LLP (57) ABSTRACT

A method for indexing a database of one or more objects having one or more attributes, includes determining which of said one or more attributes should receive concatenation, concatenating those of said one or more attributes that have been determined to receive concatenation, and indexing said database with those of said one or more attributes that have been concatenated.

57 Claims, 4 Drawing Sheets

```
Organization = Computer Associates
        office = R&D
                person = Alice
                person = Bob
                person = Charlie
        office = Sales {"Alice^photocopier","Dennis^photocopier"}
                person = Alice
                person = Dennis
                equipment = photocopier
        office = Legal {"Bob^photocopier","Erik^photocopier"}
                person = Bob
                person = Erik
                equipment = photocopier
        office = Marketing {"Fred^photocopier","George^photocopier"}
                person = Fred
                person = George
                equipment = photocopier
```

(56) References Cited

OTHER PUBLICATIONS

Blasgen M.W. et al; "An Encoding Method for Multifield Sorting and Indexing" Communications of the ACM, 'Online! vol. 20, No. 11; XP-002313409; http://portal.acm.org/citation.cfm?id=359892>, Nov. 1977.

Summons to attend oral proceedings pursuant to Rule 115(1) EPC, Application No. 04778033.3-2201/1646959, Reference HCD/J00048449EP, 5 pages, Dec. 5, 2009.

* cited by examiner

Fig. 1

```
Organization = Computer Associates
    office = R&D
        person = Alice
        person = Bob
        person = Charlie
    office = Sales
        person = Alice
        person = Dennis
        equipment = photocopier
    office = Legal
        person = Bob
        person = Erik
        equipment = photocopier
    office = Marketing
        person = Fred
        person = George
        equipment = photocopier
```
↘ 11

Fig. 2

```
Organization = Computer Associates
    office = R&D
        person = Alice
        person = Bob
        person = Charlie
    office = Sales {"Alice^photocopier","Dennis^photocopier"}
        person = Alice
        person = Dennis
        equipment = photocopier
    office = Legal {"Bob^photocopier","Erik^photocopier"}
        person = Bob
        person = Erik
        equipment = photocopier
    office = Marketing {"Fred^photocopier","George^photocopier"}
        person = Fred
        person = George
        equipment = photocopier
```
⟍21

FAST SEARCHING OF DIRECTORIES

REFERENCE TO RELATED APPLICATION

This is a X continuation of application Ser. No. 10/887,991 filed Jul. 9, 2004 now abandoned which claims the benefit of Provisional application No. 60/486,650 filed in the U.S. on Jul. 11, 2003.

BACKGROUND

1. Technical Field

The present disclosure relates to directories and, more specifically, to fast searching of directories.

2. Description of the Related Art

Web based applications, for example, web services, are quickly transforming the way modern businesses interact and share information. Web services are software systems for providing particular functionality over a computer network, for example, the Internet. Web services can generally be identified by Universal Resource Identifiers (URI) in a fashion that may be analogous to the way websites may be identified by Uniform Resource Locators (URLs). Web services generally contain public interfaces and bindings that enable users and other software systems such as other web services to seamlessly utilize the functionality of the web services. In this way, web services enhance the way computers communicate with users and each other.

One particularly common web service is the web based directory service. Web based directory services allow for access to a directory across a computer network, for example, the Internet. A directory is a specialized database that is primarily used for allowing a large number of people to quickly look up information. A directory is not intended to be primarily used as a tool for the organization and storage of data and is therefore optimized for information retrieval and not necessarily information storage. Directories lend to be designed for particular purposes and are not commonly used for general purpose searches. For example, the types of searches that a directory will handle are usually known ahead of time.

A directory service is a computer application that allows for access to a directory. Directory services may conform to sets of standards such as, for example, the X.500 standard pertaining to electronic directory services. Users may interact with directories using standardized languages such as, for example, Directory Services Markup Language (DSML). DSML is a variant of Extensible Markup Language (XML), the human-readable communications language commonly used by web based applications for exchanging information between computers without regard to the computer's platfomm. DSML is specifically tailored for communicating directory information.

While some directory services are local and only allow for use on a closed computer network, other directory services are global and allow for general access over an open computer network such as the Internet.

Directory services may have redundant servers placed over a broad geographic area all of which cooperate to provide directory service. Such directory services are known as distributed directory services. The Internet Domain Name System (DNS) is an example of a global distributed directory service. The DNS allows computers connected to the internet to look up the numeric internet address from the corresponding internet domain name.

LDAP, or Lightweight Directory Access Protocol, is a protocol for quickly and easily accessing directory services from across a computer network. LDAPs communicate using TCP/IP transfer services or similar transfer services making LDAPs well suited for use over the internet or private company intranets.

An LDAP directory is often made up of objects. Each object may contain a number of attributes. Attributes may each be of a particular type and may each have one or more values conforming to that type. Examples of types of attributes include "cn" for common name, and "mail" for an email address. Other types of attributes include text, photos, URLs, pointers, binary data, etc. The correct syntax of the value is defined by the particular type of attribute. For example, an email address with the type "mail" may have a value of "bob@domainname.com".

Objects within LDAP directories can be hierarchically arranged for more efficient searching. For example, a hierarchical LDAP directory made up of domain name objects might begin with ".com", ".org" and ".gov" objects at the top level of the hierarchy. Below each top level object may be a series of objects representing organizations, and within each of these organization objects may be a series of objects representing users. Hierarchical objects are commonly referred to as parent objects and child objects depending on their relationship to one another. For example, an object representing a printer may be the child of an object representing a computer in a hierarchical directory representing a computer network where the printer is connected to the computer. An object of any hierarchical generation may have one or more associated attributes. Attributes may be used to describe characteristics of the objects they are associated with. Each object and/or attribute may have one or more associated values.

Figure 1:
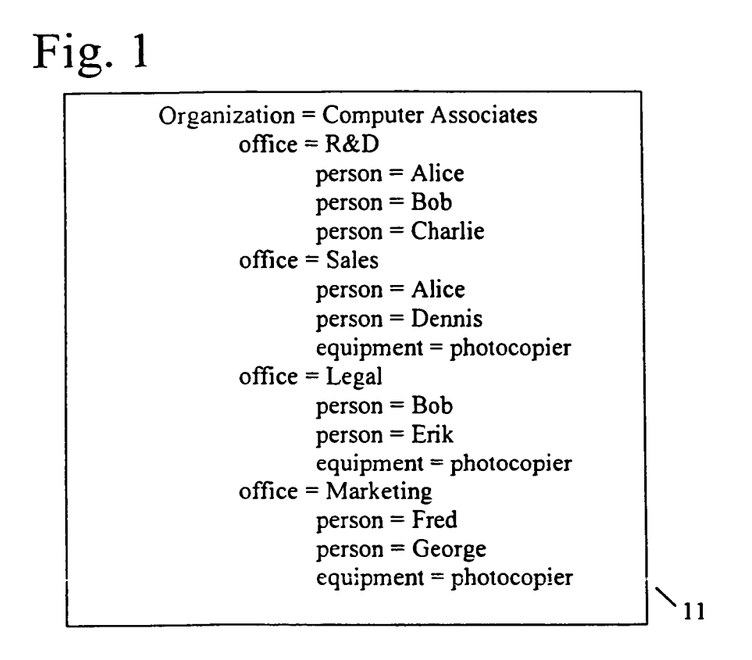
FIG. 1 is a block diagram showing an example directory structure.

FIG. 1 is a block diagram showing an example of a hierarchical directory structure. Here the top level object (root object) is "organization." This object has a string type and a value of "Computer Associates." The child objects of the root object are called "office." These objects have a string type and values of "R&D," "Sales," "Legal," and "Marketing." The child objects of the office objects include "person" or "equipment" objects. These objects have a string type and have various values.

LDAP directory services are commonly based on a client-server model. While one or more LDAP servers contain the LDAP data, a client may be launched by a person seeking to access LDAP directory data. The client may connect to the server and communicate the search criteria. The server may then communicate the search results to the client. The client may then communicate the search results to the user.

One common example of a LDAP directory service is a service that resolves email addresses from names. Such directory services are commonly accessed by email clients that connect to email servers. In this example, the user can enter a contact's name to resolve the contact's email address.

While directories, such as those utilizing LDAP, may be well suited for the quick execution of basic search queries, directories may not be able to handle some of the more complex search queries that may be commonly handled by general purpose relational databases. For example, many directories are unable to perform the common inner join (join) operation. The join operation retrieves all objects having two or more attributes, child objects and/or child object attributes being searched for. For example, given the example directory structure illustrated in FIG. 1, a join operation may be to retrieve a list of all offices that have a person named Alice and a photocopier.

This information may still be retrieved from a directory without the use of a join operation; however, retrieval may require multiple searches. For example, a first search may be made to determine all offices with a person named Alice. With respect to the example directory structure of FIG. 1, the results would be R&D and Sales. A second search would be to search R&D for a photocopier and then to search Sales for a photocopier to determine if any of the offices with an Alice also have a photocopier. This second search may be executed using multiple searches or may be combined into one long and complex search, however the results would be comparable. This technique may be long and complicated, especially with a real-world directory which might contain thousands of entries.

The need to conduct multiple searches to perform a common join operation may be a great shortcoming of directory technology. This shortcoming often frustrates newcomers to the field. Unfortunately, this shortcoming is largely intrinsic to directories. Redesign of directory technology to resolve this shortcoming in the general case may require major changes to the X.500/LDAP directory standards. Additionally, even if these standards were to be revised, most functioning directory architecture might not be capable of supporting the enhanced functionality.

SUMMARY

A method for indexing a database of one or more objects having one or more attributes includes determining which of said one or more attributes should receive concatenation, concatenating those of said one or more attributes that have been determined to receive concatenation, and indexing said database with those of said one or more attributes that have been concatenated.

A method for searching an indexed database of one or more objects having one or more attributes, includes receiving a query to search for an object having two or more particular attributes and searching for an object with an attribute that is a concatenation of said two or more particular attributes.

A system for indexing a database of one or more objects having one or more attributes, includes a determining unit for determining which of said one or more attributes should receive concatenation, a concatenating unit for concatenating those of said one or more attributes that have been determined to receive concatenation, and an indexing unit for indexing said database with those of said one or more attributes that have been concatenated.

A system for searching an indexed database of one or more objects having one or more attributes, includes a receiving unit for receiving a query to search for an object having two or more particular attributes, and a searching unit for searching for an object with an attribute that is a concatenation of said two or more particular attributes.

A computer system includes a processor and a program storage device readable by the computer system, embodying a program of instructions executable by the processor to perform method steps for indexing a database of one or more objects having one or more attributes. The method includes determining which of said one or more attributes should receive concatenation, concatenating those of said one or more attributes that have been determined to receive concatenation, and indexing said database with those of said one or more attributes that have been concatenated.

A computer system includes a processor and a program storage device readable by the computer system, embodying a program of instructions executable by the processor to perform method steps for arching an indexed database of one or more objects having one or more attributes. The method includes receiving a query to search for an object having two or more particular attributes, and searching for an object with an attribute that is a concatenation of said two or more particular attributes.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

In describing the preferred embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Embodiments of the present disclosure seek to allow for the application of complex search operations, for example, the join operation, with respect to directories, for example LDAP directories.

Because directories tend to be used as special purpose data stores, rather than for storing and manipulating generic data, the types of searches that a user might request may be predictable. For example, the example directory 11 defining the Organization may be searched for the names of people and types of equipment located in each office. Embodiments of the present disclosure seek to utilize this knowledge to prepare the directory for the anticipated types of searches.

For example, object data within the directory may be concatenated and indexed. These indexes may then be added as attributes of each office object in the directory. Concatenation is the combining of one or more of the possible combinations of object attributes that a user might issue a search for. Object attributes may be, for example, attributes associated with child objects of the object. For example, anticipating that a user might issue a search for offices with a particular person and a particular equipment item, each combination of a person and an equipment item may be concatenated. For example, with respect to example directory 11, within the R&D office, no attributes need be concatenated because there are no possible combinations of a particular person and a particular equipment item. Within the Sales office, Alice and photocopier may be concatenated and Dennis and photocopier may be concatenated because they represent the various combinations of a particular person and a particular equipment item. Accordingly, in the Legal office, Bob and photocopier may be concatenated and Erik and photocopier may be concatenated. In the Marketing office, Fred and photocopier may be concatenated and George and photocopier may be concatenated.

To determine which object attributes should be concatenated, a type of search may be anticipated. In addition to the type of search described above, there are other possible searches that may be anticipated. For example it may be anticipated that a user might issue a search for an office that includes two particular people. Where such a search is anticipated, each possible combination of two people within each office object may be concatenated.

Concatenation is not limited to combining only two object attributes. Any number of object attributes may be concatenated. For example, where it is anticipated that a user might issue a search for an office that includes three particular people, every possible combination of three people within each office object may be concatenated.

There are many possible methods by which object attributes may be concatenated. For example, attributes being concatenated may be combined as a single word with a separator character between them. This separator character may be a character that is not likely to appear within the data. For example, the caret character ("^") may be a good character to use for directories that store data in English. Other examples of good separator characters may include the dollar sign character ("$") and the null character (ASCII value 0). For illustrative purposes, the examples illustrated in this disclosure will use the caret character as the separator character.

Where a separator character has been chosen, for example the caret character has been chosen, object attributes may be concatenated by combining them as a single word with the caret character between them. For example, concatenating Alice and photocopier would produce "Alice^photocopier".

Figure 2:
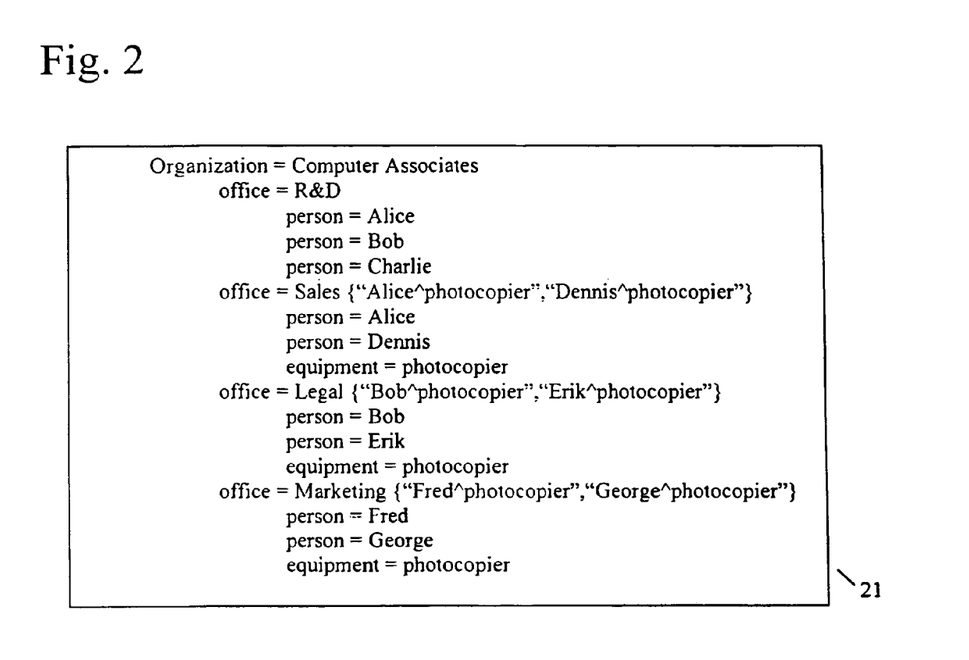
FIG. 2 is a block diagram showing an example of how the example directory structure of FIG. 1 may be indexed according to an embodiment of the present disclosure.

Concatenated attributes may be used as an index and these indexes may be added as attributes of each object in the directory being searched for. FIG. 2 is a block diagram showing an example of how the example directory 11 of FIG. 1 may be indexed according to an embodiment of the present disclosure. In this example 21, the example directory 11 has been indexed in anticipation of a search that would request all office objects with a particular person and a particular equipment item. In this example 21, the separation character selected is the caret.

For each office each possible combination of a person and equipment is identified. In the R&D office, because there is no equipment, there are no such combinations. In the Sales office, the possible combinations include "Alice and photocopier" and "Dennis and photocopier." These combinations may be concatenated to produce "Alice^photocopier" and "Dennis^photocopier" indexes. These indexes may then be added as attributes of the R&D office object.

A directory may be indexed, according to embodiments of the present disclosure, at any time prior to a user executing a search. For example, the directory may be indexed as each object of the directory is created or all at once after the directory has been created. The indexing of directories according to embodiments of the present disclosure, may be carried out manually, for example, by a user entering in objects into the directory, or automatically using an application designed to index according to the preset disclosure.

An indexed directory may be easily searched using complex search operations, for example the join operation. When a search is requested, for example, a search for all offices containing an Alice and a photocopier, the directory is searched for an "Alice^photocopier" attribute. Where such a combination exists, such an index will be found as an attribute. The objects where the index was found may then be returned as results of the search. For example, in the example directory 11 21, "Alice^photocopier" may be found at the Sales office.

According to an embodiment of the present disclosure, a user interface may be used to convert a complex search request (query), for example a query requesting a join operation, into a search for a concatenated index. According to another embodiment of the present disclosure, a user wishing to conduct a search may manually initiate a search for a concatenated index.

The order in which object attributes are concatenated may affect the success of the search. For example, a search for "photocopier^Alice" may not return the desired results. According to one embodiment of the present disclosure, a convention can be established whereby the concatenation order is predetermined. For example, object attributes may be concatenated in alphabetical order or according to another predetermined order. Alternatively, a search may include all possible orders. For example, a search may search for both "Alice^photocopier" and "photocopier^Alice". Alternatively, when the object is indexed, it may be indexed multiple times, once for each possible order. These techniques may be implemented manually or automatically, for example by a directory client.

Figure 3:
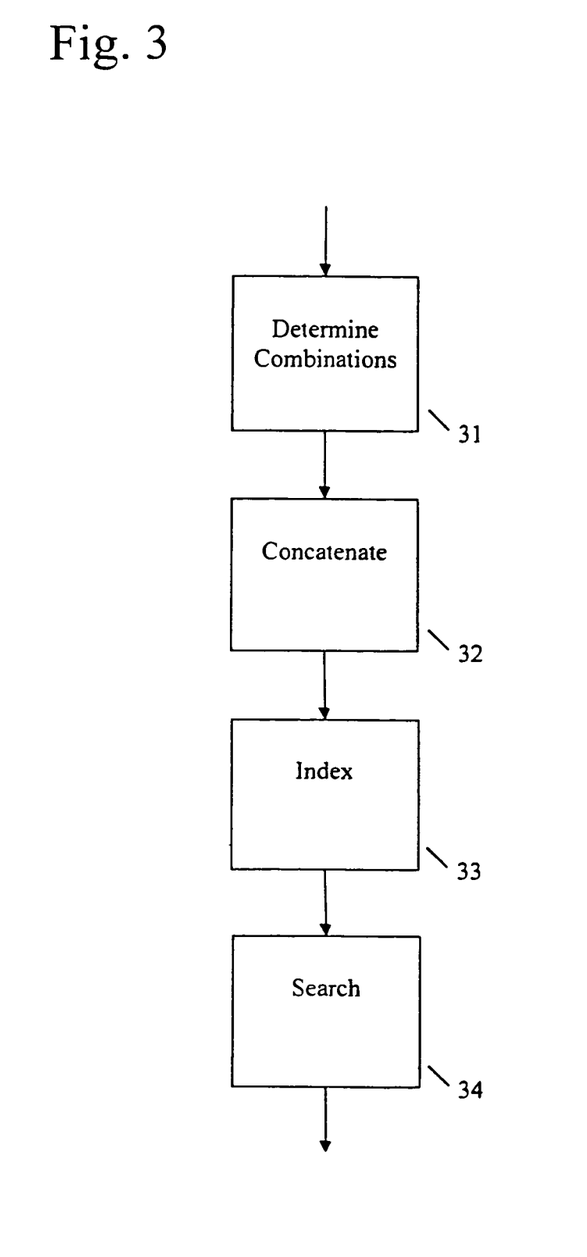
FIG. 3 is a flow chart illustrating an embodiment of the present disclosure.

FIG. 3 is a flow chart illustrating an embodiment of the present disclosure. According to this embodiment, the first step is to determine which object attributes should be concatenated (Step S31). Next, the object attributes determined to be concatenated should be concatenated using a predetermined separator character (Step S32). The directory should then be indexed by adding the concatenated objects as attributes of objects in the directory (Step S33). The indexed directory may then be searched (Step S34).

Figure 4:
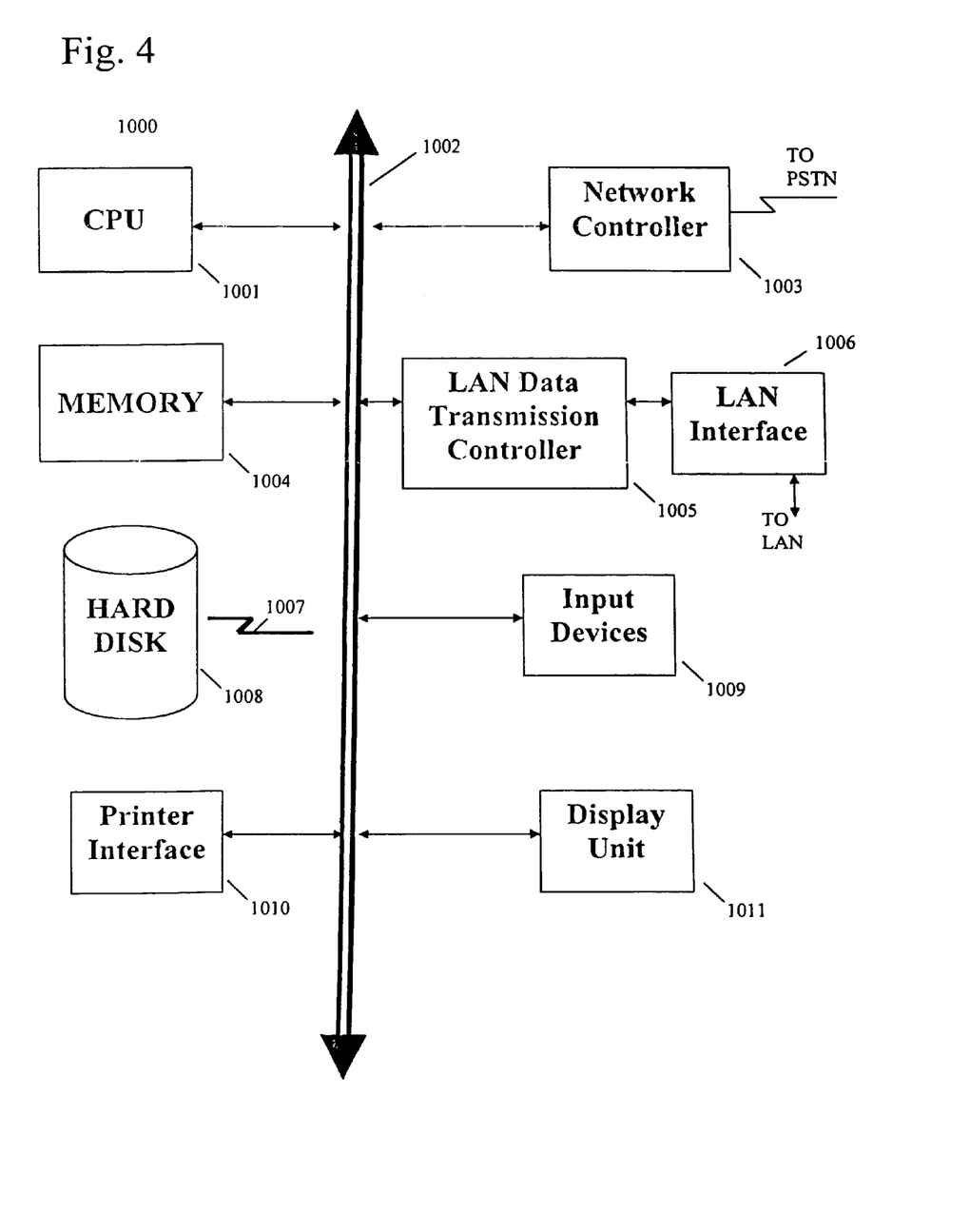
FIG. 4 is a block diagram showing an example of a computer system capable of implementing the method and apparatus according to embodiments of the present disclosure.

FIG. 4 is a block diagram showing an example of a computer system which may implement the method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal buss 1002, and one or more input devices 1009, for example, a keyboard, mouse etc. As shown, the system 1000 may be connected to a data storage device, for example, a hard disk, 1008 via a link 1002.

The above specific embodiments are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims.

What is claimed is:

1. A computer-implemented method for indexing a database of one or more objects having one or more attributes, wherein the computer comprises a memory and a central processing unit, the method comprising:
   determining combinations of the one or more attributes that are anticipated to be used in a search of the database;
   grouping the combinations for concatenation, the combinations comprising attributes of one or more child objects having a same parent object;
   concatenating the combinations; and indexing the database using the concatenated combinations, the indexing comprising storing the concatenated attributes.

2. The method of claim 1, wherein said one or more attributes are attributes of one or more child objects that are children of the one or more objects.

3. The method of claim 1, wherein said database is a directory.

4. The method of claim 3, wherein said directory is Lightweight Directory Access Protocol directory.

5. The method of claim 3, wherein said directory is an x.500 directory.

6. The method of claim 1, wherein determining the combinations comprises:
   selecting a first type of attribute of said one or more attributes that is anticipated to be searched for in the database;
   selecting a second type of attribute of said one or more attributes that is anticipated to be searched for in the database along with said first type of attribute; and
   determining combinations of attributes of said selected first type and attributes of said selected second type.

7. The method of claim 1, wherein determining the combinations comprises:
   selecting a first type of attribute of said one or more attributes that is anticipate to be searched for in the database;
   selecting a second type of attribute of said one or more attributes that is anticipated to be searched for in the database along with said first type of attribute;
   selecting a third type of attribute of said one or more attributes that is anticipated to be searched for in the database along with said first type of attribute and said second type of attribute; and
   determining combinations of attributes of said selected first type, attributes of said selected second type, and attributes of said selected third type.

8. The method of claim 1, wherein determining the combinations comprises:
   selecting two or more types of attribute of said one or more attributes that are anticipated to be searched for in the database; and
   determining all combinations of attributes of said selected types of attributes.

9. The method of claim 1, wherein concatenating the combinations comprises combining attributes as a single word separated by a separation character.

10. The method of claim 9, wherein said separation character is a caret character.

11. The method of claim 9, wherein said separation character is a dollar sign.

12. The method of claim 9, wherein said separation character is a null character.

13. The method of claim 1, wherein said indexing said database comprises adding attributes that have been concatenated as attributes of respective ones of said one or more objects to which the attributes that have been concatenated belonged.

14. A computer-implemented method for searching an indexed database of one or more objects having one or more attributes, wherein the computer comprises a memory and a central processing unit, the method comprising:
   receiving a query to search for an object having two or more particular attributes;
   searching for an object with an attribute that is a concatenation of said two or more particular attributes, the particular attributes including attributes of one or more child objects having a same parent object; and
   returning the object with the attribute that is the concatenation of the two or more particular attributes, wherein the object was assigned the attribute that the concatenation of the two or more particular attributes by:
      determining, combinations of the one or more attributes that are anticipated to be used in a search of the database;
      grouping the combinations for concatenation; and
      concatenating the combinations.

15. The method of claim 14, wherein said one or more attributes are attributes of one or more child objects that are children of the one or more objects.

16. The method of claim 14, wherein said concatenation of said two or more particular attributes comprises combining said two or more particular attributes as a single word separated by a separation character.

17. The method of claim 16, wherein said separation character is a caret character.

18. The method of claim 16, wherein said separation character is a dollar sign.

19. The method of claim 16, wherein said separation character is a null character.

20. A system including hardware and configured to index a database of one or more objects having one or more attributes, comprising:
   a determining unit for determining combinations of the one or more attributes that are anticipated to be used in a search of the database;
   a grouping unit for grouping the combinations for concatenation, the combinations comprising attributes of one or more child objects having a same parent object;
   a concatenating unit for concatenating the combinations; and
   an indexing unit for indexing said database using the concatenated combinations, the indexing comprising storing the concatenated attributes.

21. The system of claim 20, wherein said one or more attributes are attributes of one or more child objects that are children of the one or more objects.

22. The system of claim 20, wherein said database is a directory.

23. The system of claim 20, wherein said directory is Lightweight Directory Access Protocol directory.

24. The system of claim 20, wherein said directory is an x.500 directory.

25. The system of claim 20, wherein the determining unit comprises:
   a first-selecting unit for selecting a first type of attribute of said one or more attributes that is anticipated to be searched for in the database;
   a second-selecting unit for selecting a second type of attribute of said one or more attributes that is anticipated to be searched for in the database along with said first type of attribute; and
   a combination-determining unit for determining combinations of attributes of said selected first type and attributes of said selected second type.

26. The system of claim 20, wherein the determining unit comprises:
   a first-selecting unit for selecting a first type of attribute of said one or more attributes that is anticipated to be searched for in the database;

a second-selecting unit for selecting a second type of attribute of said one or more attributes that is anticipated to be searched for in the database along with said first type of attribute;

a third-selecting unit for selecting a third type of attribute of said one or more attributes that is anticipated to be searched for in the database along with said first type of attribute and said second type of attribute; and a combination-determining unit for determining combinations of attributes of said selected first type, attributes of said selected second type, and attributes of said selected third type.

27. The system of claim 20, wherein the determining unit comprises:

a selecting unit for selecting two or more types of attribute of said one or more attributes that are anticipated to be searched for in the database; and a combination-determining for determining combinations of attributes of said selected types of attributes.

28. The system of claim 20, wherein said concatenating unit comprises a combining unit for combining attributes as a single word separated by a separation character.

29. The system of claim 28, wherein said separation character is a caret character.

30. The system of claim 28, wherein said separation character is a dollar sign.

31. The system of claim 28, wherein said separation character is a null character.

32. The system of claim 20, wherein said indexing unit comprises adding attributes that have been concatenated as attributes of respective ones of said one or more objects to which the attributes that have been concatenated belonged.

33. A system including hardware and configured to search an indexed database of one or more objects having one or more attributes, comprising:

a receiving unit for receiving a query to search for an object haying two or more particular attributes;

a searching unit for searching for an object with an attribute that is a concatenation of said two or more particular attributes, the particular attributes including attributes of one or more child objects having a same parent object; and returning the object with the attribute that is the concatenation of the two or more particular attributes, wherein the object was assigned the attribute that is the concatenation of the two or more particular attributes by:

determining combinations of the one or more attributes that are anticipated to be used in a search of the database;

grouping the combinations for concatenation; and concatenating the combinations.

34. The system of claim 33, wherein said one or more attributes are attributes of one or more child objects that are children of the one or more objects.

35. The system of claim 33, wherein said concatenation of said two or more particular attributes comprises a combination of said two or more particular attributes as a single word separated by a separation character.

36. The system of claim 35, wherein said separation character is a caret character.

37. The system of claim 35, wherein said separation character is a dollar sign.

38. The system of claim 35, wherein said separation character is a null character.

39. A computer system comprising:
a processor; and a program storage device readable by the computer system, embodying a program of instructions executable by the processor to index a database of one or more objects having one or more attributes by:

determining combinations of the one or more attributes that are anticipated to be used in a search of the database;

grouping the combinations for concatenation, the combinations comprising attributes of one or more child objects having a same parent object;

concatenating the combinations; and indexing the database using the concatenated combinations, the indexing comprising storing the concatenated attributes.

40. The computer system of claim 39, wherein said one or more attributes are attributes of one or more child objects that are children of the one or more objects.

41. The computer system of claim 39, wherein said database is a directory.

42. The computer system of claim 41, wherein said directory is Lightweight Directory Access Protocol directory.

43. The computer system of claim 41, wherein said directory is an x.500 directory.

44. The computer system of claim 39, wherein determining the combinations comprises:

selecting a first type of attribute of said one or more attributes that is anticipated to be searched for in the database;

selecting a second type of attribute of said one or more attributes that is anticipated to be searched for in the database along with said first type of attribute; and determining combinations of attributes of said selected first type and attributes of said selected second type.

45. The computer system of claim 39, wherein determining the combinations comprises:

selecting, a first type of attribute of said one or more attributes that is anticipated to be searched for in the database;

selecting a second type of attribute of said one or more attributes that is anticipated to be searched for in the database along with said first type of attribute;

selecting a third type of attribute of said one or more attributes that is anticipated to be searched for in the database along with said first type of attribute and said second type of attribute; and determining combinations of attributes of said selected first type, attributes of said selected second type, and attributes of said selected third type.

46. The computer system of claim 39, wherein determining the combinations comprises:

selecting two or more types of attribute of said one or more attributes that are anticipated to be searched for in the database; and determining all combinations of attributes of said selected types of attributes.

47. The computer system of claim 39, wherein concatenating the combinations comprises combining attributes as a single word separated by a separation character.

48. The computer system of claim 47, wherein said separation character is a caret character.

49. The computer system of claim 47, wherein said separation character is a dollar sign.

50. The computer system of claim 47, wherein said separation character is a null character.

51. The computer system of claim 39, wherein said indexing said database comprises adding attributes that have been concatenated as attributes of respective ones of said one or more objects to which the attributes that have been concatenated belonged.

52. A computer system comprising:
a processor; and
a program storage device readable by the computer system, embodying a program of instructions executable by the processor to search an indexed database of one or more objects having one or more attributes by:
receiving a query to search for an object having two or more particular attributes;
searching for an object with an attribute that is a concatenation of said two or more particular attributes, the particular attributes including attributes of one or more child objects having a same parent object; and
returning the object with the attribute that is the concatenation of the two or more particular attributes, wherein the object was assigned the attribute that is the concatenation of the two or more particular attributes by:
determining combinations of the one or more attributes that are anticipated to be used in a search of the database;
grouping the combinations for concatenation; and
concatenating the combinations.

53. The computer system of claim 52, wherein said one or more attributes are attributes of one or more child objects that are children of the one or more objects.

54. The computer system of claim 52, wherein said concatenation of said two or more particular attributes comprises combining said two or more particular attributes as a single word separated by a separation character.

55. The computer system of claim 54, wherein said separation character is a caret character.

56. The computer system of claim 54, wherein said separation character is a dollar sign.

57. The computer system of claim 54, wherein said separation character is a null character.

* * * * *

UNITED STATES PATENT AND TRADEMARK OFFICE
CERTIFICATE OF CORRECTION

PATENT NO.        : 8,745,030 B2                                         Page 1 of 1
APPLICATION NO.   : 11/089414
DATED             : June 3, 2014
INVENTOR(S)       : C. Betts et al.

It is certified that error appears in the above-identified patent and that said Letters Patent is hereby corrected as shown below:

In the Claims

Column 7, line 27 (claim 7, line 4) of the printed patent, change "anticipate" to "anticipated" after is.

Column 7, line 41 (claim 8, line 3) of the printed patent, change "attribute" to "attributes" after of.

Column 8, line 7 (claim 14, line 15) of the printed patent, delete "," after determining.

Column 9, line 15 (claim 27, line 3) of the printed patent, change "attribute" to "attributes" after of.

Signed and Sealed this
Sixteenth Day of December, 2014

Michelle K. Lee
*Deputy Director of the United States Patent and Trademark Office*